(12) United States Patent
Drapeau

(10) Patent No.: US 7,169,288 B2
(45) Date of Patent: Jan. 30, 2007

(54) METHODS AND SYSTEMS OF CATHODIC PROTECTION FOR METALLIC ENCLOSURES

(75) Inventor: Richard J. Drapeau, Victoria, MN (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 274 days.

(21) Appl. No.: 10/980,035

(22) Filed: Nov. 3, 2004

(65) Prior Publication Data

US 2006/0091001 A1    May 4, 2006

(51) Int. Cl.
C23F 13/02    (2006.01)

(52) U.S. Cl. .............. 205/730; 205/734; 205/740; 205/724; 205/725; 204/196.01; 204/196.02; 204/196.04; 204/196.1; 204/196.21; 204/196.36; 204/196.37

(58) Field of Classification Search ........... 204/196.01, 204/196.02, 196.04, 196.1, 196.21, 196.36, 204/196.37; 205/724, 725, 730, 734, 740
See application file for complete search history.

(56) References Cited

U.S. PATENT DOCUMENTS

| | | | |
|---|---|---|---|
| 5,574,610 A * | 11/1996 | Tachick et al. | 361/56 |
| 5,758,102 A * | 5/1998 | Carey et al. | 710/302 |
| 6,724,589 B1 * | 4/2004 | Funderburk | 361/42 |

* cited by examiner

*Primary Examiner*—Bruce F. Bell
(74) *Attorney, Agent, or Firm*—Fogg and Associates LLC; David N. Fogg; Laura A. Ryan

(57) ABSTRACT

Systems and methods of cathodic protection. The system includes a metallic housing, a backplane situated within the metallic housing, a cathodic protection card coupled to the backplane and a permanent anode, external to the metallic housing, coupled to the cathodic protection card through an isolated port. The cathodic protection system is powered using span power. The permanent anode and metallic housing are adapted to form a closed circuit when both come in contact with an electrolyte. The permanent anode is maintained at a higher potential than the metallic housing.

47 Claims, 6 Drawing Sheets

METHODS AND SYSTEMS OF CATHODIC PROTECTION FOR METALLIC ENCLOSURES

TECHNICAL FIELD

The present invention relates generally to the field of telecommunications, and, in particular, to impressed-current cathodic protection of metallic telecommunication enclosures.

BACKGROUND

Telecommunication housings shield, secure, and protect telecommunication network cables and components from its surroundings. These housings, often constructed of metallic materials, are usually low-lying and commonly installed in space-limited environments. These environments include underground enclosures such as manholes where flooding can occur. In such environments, these metallic telecommunication housings are subjected to moderate to severe corrosion due to issues of galvanic corrosion and corrosive media, and to other forms of corrosion relating from immersion and stray ground currents.

There is a significant need for corrosion protection for these metallic telecommunication housings. One method of corrosion protection currently employed for immersed and intermittently immersed metallic telecommunication housings is sacrificial cathodic protection using sacrificial anodes. In this method, a potential inhibiting corrosion develops between the protected metallic housing and a metallic substance, (the sacrificial anode), that contains a lower galvanic potential than that of the protected metallic housing. The potential difference between the protected metallic housing and a properly selected sacrificial anode prevents the corrosion reaction of the protected structure at the expense of corroding the sacrificial anode. While this can be an effective method in protecting the metallic housing, the sacrificial anode must be regularly maintained and the surrounding environment is affected by high levels of metallic corrosion products released by the sacrificial anode into the immersion environment (electrolyte). Regular maintenance includes replacing the sacrificial anode. In some instances, when performing maintenance the standing water in the enclosed environment is removed. Typically this water is pumped into storm sewers. This has caused an environmental issue of contaminating the ground and water with the metallic corrosion products released by the sacrificial anode found in this standing water.

Another method of corrosion protection currently employed for immersed and intermittently immersed metallic telecommunication housings is impressed current cathodic protection using a permanent anode. In this method, a potential inhibiting corrosion is impressed between the protected metallic housing and a metallic substance, (the permanent anode). The potential difference between the protected metallic housing and a properly selected permanent anode prevents the corrosion reaction of the protected structure at the expense of power. Access to external power sources are needed and take up valuable space in the confined environment. Also when AC power is provided additional components such as a rectifier to convert the power to DC for use in the impressed current cathodic protection system is needed. Again requiring more equipment in a congested environment.

Another method of corrosion protection is the use of a barrier coating. The barrier coating, when applied directly onto the electronics housing, creates a seal around the housing, protecting it from the surrounding, corrosive environment. This method can be effective if the housing is barrier coated before the housing is subjected to a corrosive environment. Once corrosion has begun on the housing however, creating an effective bond on the metallic surface is difficult. Many of the metallic housings that require corrosive protection have already been placed in corrosive environments and as such effective barrier coating is difficult to achieve. Congested installation sites may further complicate the field application of a barrier coating. The need for a retrofitable solution is high.

For the reasons stated above, and for other reasons stated below which will become apparent to those skilled in the art upon reading and understanding the present specification, there is a need in the telecommunications industry for an effective, low maintenance and low replacement method of protecting existing and new metallic telecommunication housings from corrosion. Furthermore, there is a need to avoid the use of additional components and power utility drops in the space limited environment that overcomes the limitations noted above.

SUMMARY

Embodiments of the present invention address problems with providing cathodic protection of metallic housings In one embodiment, a system for cathodic protection is provided. The system includes a metallic housing, a backplane situated within the metallic housing, a cathodic protection card coupled to the backplane and a permanent anode, external to the metallic housing, coupled to the cathodic protection card through an isolated port. The cathodic protection system is powered using span power. Wherein the permanent anode and metallic housing are adapted to form a closed circuit when both come in contact with an electrolyte. Wherein the permanent anode is maintained at a higher potential than the metallic housing.

In one embodiment, a method cathodic protection for a metallic housing is provided. The method includes coupling a cathodic protection card to a backplane within the metallic housing, connecting a permanent anode, external to the metallic housing, to the cathodic protection card by a line through an isolated port, providing span power to the cathodic protection card, and maintaining the permanent anode at a higher potential than the metallic housing. When the permanent anode and metallic housing both come in contact with an electrolyte, forming a closed circuit between the permanent anode and the metallic housing such that positive current flows from the metallic housing to the permanent anode through the line, and positive current flows from the permanent anode to the metallic housing through the electrolyte.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide methods and systems of impressed-current cathodic protection for metallic electronics enclosures. In one or more embodiments, span power is used to power a cathodic protection system that is mounted internal to the electronics housing in a standard telecommunications repeater connector interface.

In one or more embodiments span power is used to produce an electrical potential between the protected metallic housing and a permanent anode. The electrical potential difference between the protected metallic housing and the permanent anode inhibits the corrosion reaction at the protected structure. This method eliminates the need for regular maintenance by providing an anode that is permanent and does not need frequent replacement. Another beneficial aspect of this method is that the anode does not release metallic elements into nearby water, preventing possible contamination to the surrounding environment. One or more embodiments use span power and do not require a local power source. Further this method does not take up valuable space in environments where space is significantly limited and allows for retrofit with the current housings.

Figure 1:
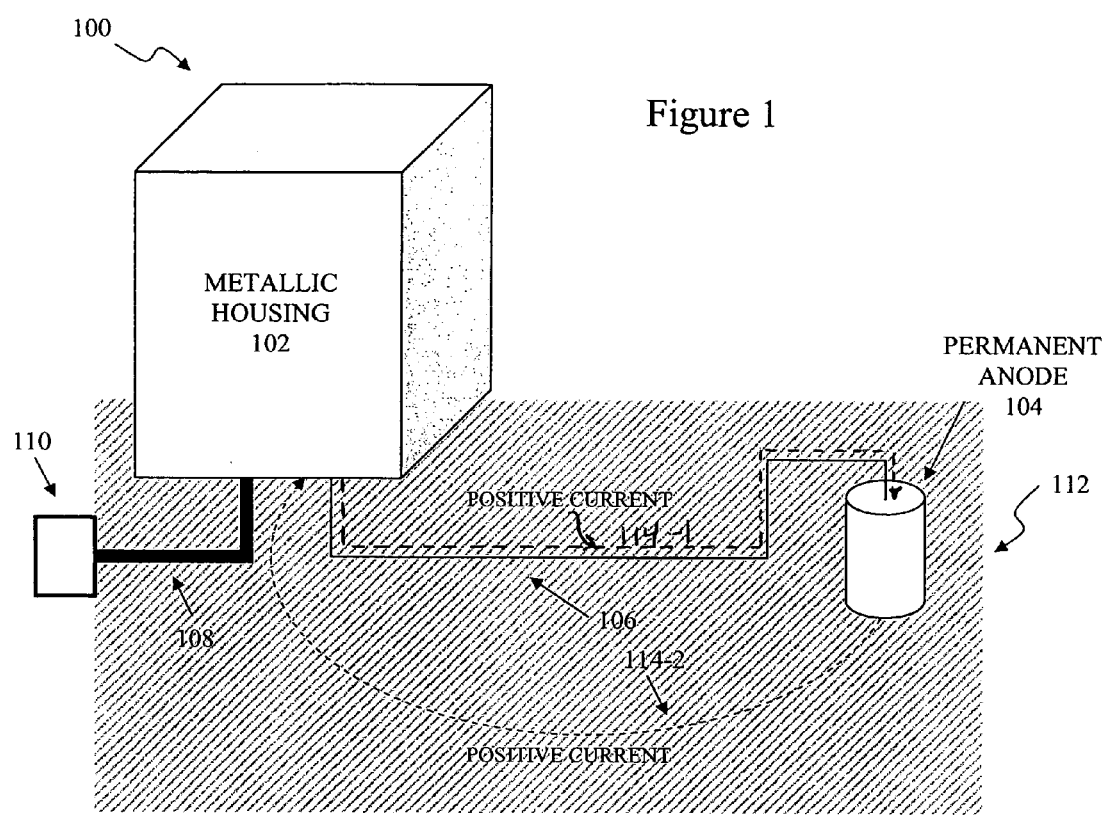
FIG. 1 is an illustration of one embodiment of an impressed-current cathodic protection system, according to the teachings of the present invention.

FIG. 1 is an illustration of a first embodiment of an impressed-current cathodic protection system generally shown at 100 according to the teachings of the present invention. System 100 includes metallic housing 102 coupled to a permanent anode 104 via line 106. In one embodiment, permanent anode 104 is fabricated from iron, steel, graphite, silicon iron, platinized titanium, platinized niobium, sintered magnetites, sintered ferrites, mixed metal oxides, or the like and is specifically selected based on the installation environment. In one embodiment, power is remotely provided to metallic housing 102. In alternate embodiments, power is provided to metallic housing 102 over span cable 108 from a network node 110.

In one embodiment, network node 110 is a central office, remote terminal, or the like. When permanent anode 104 comes into contact with electrolyte 112 from the surrounding environment and metallic housing 102 comes in contact with electrolyte 112 a closed circuit between metallic housing 102 and permanent anode 104 is created. Positive current 114-1 travels from metallic housing 102 to permanent anode 104 through line 106 and another connection is made. Positive current 114-2 travels from permanent anode 104 to metallic housing 102 through electrolyte 112. A negative potential with respect to ground is maintained. For example in one embodiment, metallic housing 102 is floating and the potential, independent of ground, is approximately −0.85 VDC relative to permanent anode 104. In one embodiment, the potential is approximately −0.00 to −1.20 VDC.

In operation, cathodic protection occurs when permanent anode 104 and metallic housing 102 are both in contact with electrolyte 112, as is assumed to be the case for this embodiment. In one embodiment, span power is provided to metallic housing 102 from network node 110 over cable 108. Power over cable 108 produces positive current 114-1 via line 106 and positive current 114-2 via electrolyte 112 between metallic 102 housing and permanent anode 104. Permanent anode 104 consists of a conductive substance which is stable in the application environment. The potential difference between protected metallic housing 102 and permanent anode 104 inhibits corrosion reaction at metallic housing 102. In operation, the corrosion reaction at metallic house 102 is reverse biased by the excess electrons provided by the powering source.

Figure 2:
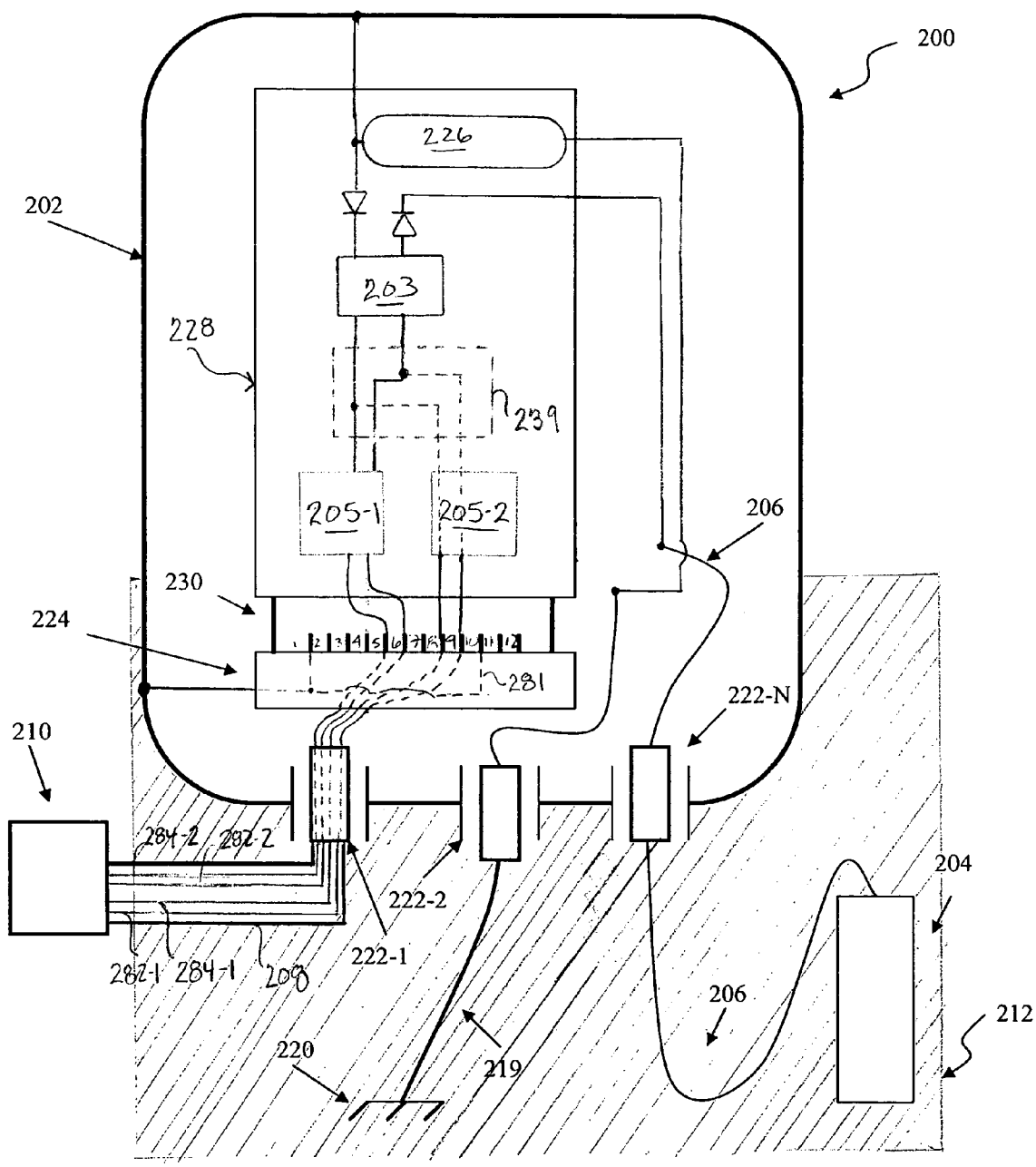
FIG. 2 is an illustration of one embodiment of an impressed-current cathodic protection system, according to the teachings of the present invention.

FIG. 2 is an illustration of one embodiment of an impressed-current cathodic protection system, shown generally at 200, according to the teachings of the present invention. System 200 includes a metallic housing 202 for electronics equipment. Metallic housing 202 includes a cathodic protection card 228 coupled to backplane 224 via printed circuit card 230. System 200 further includes a permanent anode 204 coupled to cathodic protection card 228 through an isolated port 222-N via line 206. Metallic housing 202 includes a plurality of isolated connections 222-1, 222-2 through 222-N. In one embodiment, cathodic protection card 228 includes protection circuitry 205, DC-to-DC power converter 203, and galvanic isolation circuit 226.

In one embodiment, in operation cathodic protection card 228 makes use of any one of many sources of electric potential to operate. In certain cases, the electrical potential is provided over span cable 208 from a source, such as a battery or the like, at network node 210. In one embodiment, protection circuitry 205 includes circuitry that provides protection for one or more of over current, over voltage, polarity reversal and the like. In one embodiment, cathodic protection card 228 includes a DC/DC power converter 203 that receives power from network node 210, through a protection circuit 205-1 and optional protocol synthesizer 239 over backplane 224. In one embodiment, cathodic protection card 228 includes a second protection circuit 205-2 that is coupled between another twisted pair 282, 284 and DC/DC power converter 203.

In one embodiment, cathodic protection card 228 includes an optional protocol synthesizer 239. In operation, optional protocol synthesizer 239 mimics a remote repeater and permits the supply of power from network node 210 using any standard provisioning scheme. For example, in one embodiment, optional protocol synthesizer 239 is configured to appear to node 210 as an ADC SPX-HRPTSWD1 Single Wide 239 HDSL Slimline Repeater Unit or the like. In operation, optional protocol synthesizer 239 extracts power from span cable 208. In one embodiment, one or more appropriate twisted pair(s) 282 and 284 in span cable 208 is provisioned for a standard central office powered service, such as POTS, ISDN, T1, HDSL, HDSL2, and the like, where 284-2 is the negative potential conductor of the primary provisioned pair, sometimes called the ring conductor, and 282-2 is the return conductor of the primary provisioned pair, sometimes called the tip conductor or battery return. Additional power can be obtained by the optional provisioning of additional pairs, where, for example, 284-1 is the negative potential conductor of the secondary provisioned pair and 282-1 is the return conductor of the secondary provisioned pair. The advantage of this method is that it allows the operator to provision for cathodic protection card 228 on the central office side utilizing existing products and technology.

In one embodiment, optional protocol synthesizer 239 is configured to make cathodic protection card 228 appear to be a network repeater element for the provisioned protocol. In operation, optional protocol synthesizer 239 uses functionality that exists on network repeater units today to provide any one or more of the following functions:

(1) support embedded operations channels (EOC) for maintenance and provisioning purposes;
(2) support definition of a unique address for the cathodic protection card such that messages on the end-to-end EOC can be distinguished between any repeaters and the cathodic protection card;
(3) implement timing independent of either side of the unit to ensure that impairments on one side of the cathodic protection card are not propagated to the other side;
(4) pass loop power through to a repeater or cathodic protection card further downstream;
(5) provide a DC continuity indication for shorts in the downstream span;
(6) operate normally even when no downstream span current is drawn by the cathodic protection card;
(7) shut off downstream power when a non-compatible downstream component is recognized;
(8) support the capability to disable downstream loop power enabling when a fault is detected by the cathodic protection card and re-enabling downstream loop power enabling when the fault is cleared; and
(9) support a tone-through feature to allow tracing through the cathodic protection card when the cathodic protection card is not powered.

In operation, multiple isolated connections 222-1 to 222-N allow components within metallic housing 202 to couple with components outside of metallic housing 202 without altering the voltage of the particular components or metallic housing 202. In one embodiment, isolated connections 222-1, 222-2 and 222-N allow cable 208, ground line 219 and line 206 to travel through metallic housing 202 without altering the voltage of metallic housing 202 as well as cable 208, ground line 219 and line 206. System 200 is adapted to couple to and receive power from network node 210. In one embodiment, network node 210 is a central office, remote terminal, or the like. In one embodiment cable 208 couples network node 210 to backplane 224, via isolated connection 222-1. In this embodiment, backplane 224 is located inside metallic housing 202. Local ground 220 is connected to galvanic isolation circuit 226 via ground line 219 through isolated port 222-2. Permanent anode 204 is coupled to cathodic protection card 228 via line 206 through isolated port 222-N. A backplane ground 281 is coupled to metallic housing 202.

When permanent anode 204 comes in contact with electrolyte 212, from the surrounding environment, and metallic housing 202 comes in contact with electrolyte 212 a closed circuit between metallic housing 202 and permanent anode 204 is created. Positive current travels from metallic housing 202 to permanent anode 204 through line 206 and positive current travels from permanent anode 204 to metallic housing 202 through electrolyte 212. A negative potential with respect to ground or span power return is maintained. In one embodiment, the positive currents are as discussed with respect to FIG. 1 above. Cathodic protection card 228 connects to ground 220 through galvanic isolation circuit 226 which may consist of a diode array, polarization cell, or other means of providing effective grounding over a DC potential difference. In one embodiment, metallic housing 202 further houses one or more repeaters or other electronic components. In one embodiment, cathodic protection card 228 has the same form factor as the one or more repeaters.

In operation, span power delivered from network node 210 is used to provide a DC voltage source that allows current to travel from cathodic protection card 228 to permanent anode 204 through line 206. In one embodiment, the DC power provided by network node 210 is −48 V DC. Metallic housing 202 is maintained at a lower potential with respect to ground, when metallic housing 202 and permanent anode 204 are in contact with electrolyte 212. Some of the span power is provided to cathodic protection card 228 for use in producing a −0.85 V potential between metallic housing 202 and anode 204. In one embodiment, the potential between metallic housing 202 and anode 204 is in the range between 0 and −1.20 VDC. In one embodiment, permanent anode 204 connected to a local ground 220 through electrolyte 212 has a potential of +0.00 VDC. Cathodic protection card 228 connects to local ground 220 through galvanic isolation circuit 226. The voltage difference between the protected metallic housing 202 and the permanent anode 204 prevents corrosion reaction of metallic housing 202 by displacing the electrochemical reaction to permanent anode 204.

In operation galvanic isolation circuit 226 bleeds through any power above −0.85 volts. If there is a surge of some sort, galvanic isolation circuit 226 allows that to pass through to ground 220.

Figure 3:
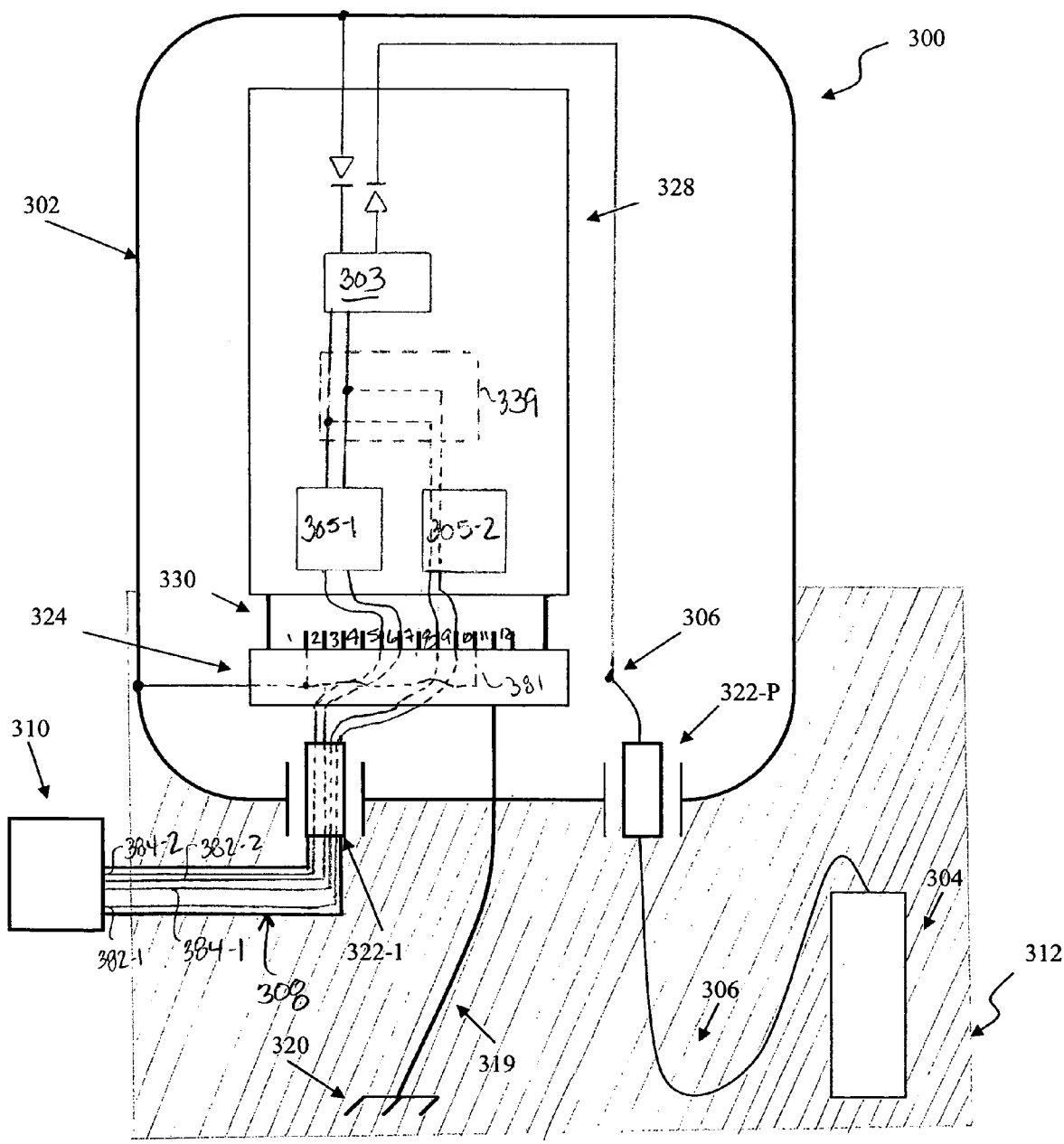
FIG. 3 is an illustration of another embodiment of an impressed-current cathodic protection system, according to the teachings of the present invention.

FIG. 3 is an illustration of another embodiment of an impressed-current cathodic protection system, shown generally at 300, according to the teachings of the present invention. System 300 includes a metallic housing 302 coupled to a permanent anode 304 through line 306. Metallic housing 302 includes isolated connections 322-1 through 322-P. Isolated connections 322-1 through 322-P allow components within metallic housing 302 to couple with components outside of metallic housing 302 without altering the voltage of the particular components or metallic housing 302. In one embodiment, isolated connections 322-1 to 322-P allow cable 308 and line 306 to travel through metallic housing 302 without altering the voltage of metallic housing 302 as well as cable 308, and line 306.

In one embodiment, system 300 is adapted to couple to a network node 310. In one embodiment, network node 310 is a central office, remote terminal, or the like. In this embodiment, backplane 324 receives power from network node 310 over cable 308 via isolated connection 322-1. In one embodiment, backplane 324 is a connector slot and backplane for common telecommunication circuit repeater cards, such as HDSL, HDSL2, HDSL4, and POTs and the like. Local ground 320 is connected to metallic housing 302 via ground line 319. Metallic housing 302 provides protection for electronics equipment. In one embodiment, metallic housing 302 includes a cathodic protection card 328 adapted to couple to backplane 324 via printed circuit board 330. Line 306 connects cathodic protection card 328 to permanent anode 304 through isolated connection 322-P. In one embodiment, cathodic protection card 328 includes a DC-to-DC power converter 303 and protection circuitry 305-1. In one embodiment, cathodic protection card 328 includes a second protection circuit 305-2 that is coupled between another twisted pair 382, 384 and DC/DC power converter 303.

In one embodiment, cathodic protection card 328 includes an optional protocol synthesizer 339. In operation, optional protocol synthesizer 339 mimics a remote repeater and permits the supply of power from network node 310 using any standard provisioning scheme. For example, in one embodiment, optional protocol synthesizer 339 is configured to appear to node 310 as an ADC SPX-HRPTSWD1 Single Wide 239 HDSL Slimline Repeater Unit or the like. In operation, optional protocol synthesizer 339 extracts power from span cable 308. In one embodiment, one or more appropriate twisted pair(s) 382 and 384 in span cable 308 is provisioned for a standard central office powered service, such as POTS, ISDN, T1, HDSL, HDSL2, and the like, where 384-2 is the negative potential conductor of the primary provisioned pair, sometimes called the ring conductor, and 382-2 is the return conductor of the primary provisioned pair, sometimes called the tip conductor or battery return. Additional power can be obtained by the optional provisioning of additional pairs, where, for example, 384-1 is the negative potential conductor of the secondary provisioned pair and 382-1 is the return conductor of the secondary provisioned pair. The advantage of this method is that it allows the operator to provision for cathodic protection card 328 on the central office side utilizing existing products and technology.

In one embodiment, optional protocol synthesizer 339 is configured to make cathodic protection card 328 appear to be a network repeater element for the provisioned protocol. In operation, optional protocol synthesizer 339 uses functionality that exists on network repeater units today to provide one or more of the functions discussed with respect to optional synthesizer 239 of FIG. 2.

In operation, when permanent anode 304 and metallic housing 302 both come in contact with electrolyte 312, from the surrounding environment, a closed circuit between metallic housing 302 and permanent anode 304 is created. Positive current travels from metallic housing 302 to permanent anode 304 through line 306 and positive current travels from permanent anode 304 to metallic housing 302 through electrolyte 312. In one embodiment, the positive currents are as discussed with respect to FIG. 1 above. Cathodic protection card 328 connects to ground 320 through housing 302. In this embodiment, metallic housing 302 and the ground system are floated relative to permanent anode 304.

In one embodiment, metallic housing 302 further houses one or more repeaters, electronic circuit cards or the like. In one embodiment, cathodic protection card 328 has the same form factor as the one or more repeaters.

In one embodiment, network node 310 provides span power to electronics of metallic housing 302 through isolated connection 322-1 via cable 308. Span power delivered from network node 310 is used to provide a DC voltage source that allows current to travel from backplane 324 through cathodic protection card 328 to permanent anode 304 through isolated connection 322-P via line 306. In one embodiment, the DC power provided by network node 310 is −48 V DC. Span power is provided to cathodic protection card 328 for use in a producing a −0.85 V potential between metallic housing 302 with ground 320 and permanent anode 304. Permanent anode 304, in contact with electrolyte 312, is referenced at 0.00 volts. Backplane 324 and metallic housing 302 connect to local ground 320 through ground line 319. In this embodiment, backplane 324, metallic housing 302 and local ground 319 are set at approximately −0.85 volts relative to permanent anode 304. As a result, cathodic protection is provided to both metallic housing 302 and ground system (including ground 320, line 319 and any bond points). A backplane ground 381 is coupled to metallic housing 302.

Isolated connections 322-1 and 322-P allow cable 308 and line 306, respectively to travel through metallic housing 302 without altering the voltage of metallic housing 302 as well as cable 308 and line 306. In one embodiment, metallic housing 302 and ground 320 are floated by approximately −0.85 VDC relative to permanent anode 304. The potential difference between the protected metallic housing 302 and the permanent anode 304 prevents corrosion reaction of metallic housing 302 and the ground system by displacing the electrochemical reaction to permanent anode 304.

Figure 4:
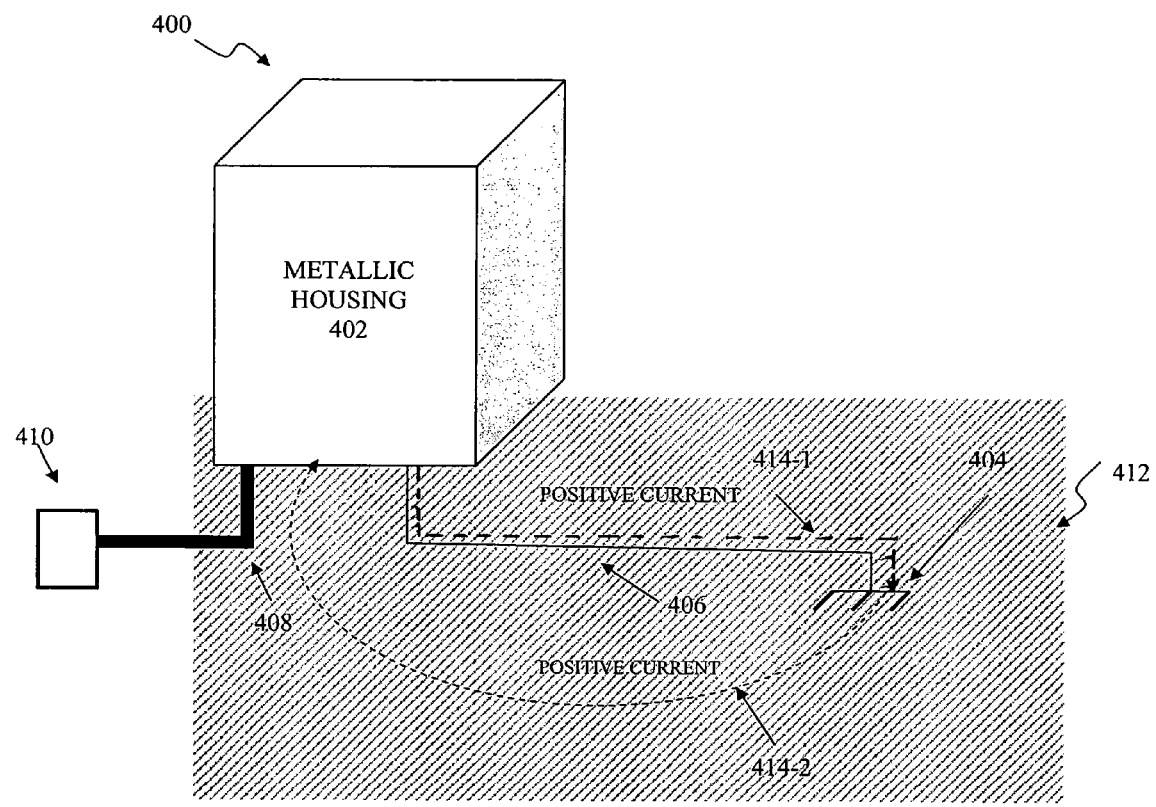
FIG. 4 is an illustration of an alternate embodiment of an impressed-current cathodic protection system, according to the teachings of the present invention.

FIG. 4 is an illustration of yet another embodiment of an impressed-current cathodic protection system generally shown at 400 according to the teachings of the present invention. System 400 includes metallic housing 402 coupled to a local ground 404 through line 406. In this embodiment, local ground 404 functions as the permanent anode. Power is provided to metallic housing 402 over cable 408 from a network node 410. In one embodiment, network node 410 is a central office, remote terminal, or the like. When local ground 404 comes in contact with electrolyte 412 from the surrounding environment and metallic housing 402 comes in contact with electrolyte 412 another connection is made. When this connection is made a closed circuit between metallic housing 402 and local ground (permanent anode) 404 is created. Positive current 414-1 travels from metallic housing 402 to local ground or permanent anode 404 through line 406 and positive current 414-2 travels from local ground or permanent anode 404 to metallic housing 402 through electrolyte 412. The connection of local ground 404 to housing 402 makes use of a diode array or galvanic isolator provides DC decoupling while still providing an effective grounding path.

In operation, cathodic protection occurs when local ground 404 is covered and metallic housing 402 is in contact with electrolyte 412. Span power received from network node 410 is modified to produce positive current 414 between metallic 402 housing and local ground 404. Local ground or permanent anode 404 contains a higher potential than the potential of metallic housing 402. The potential difference between protected metallic housing 402 and local ground or permanent anode 404 inhibits corrosion reaction at metallic housing 402 by displacing the electrochemical reaction to local ground 404.

Figure 5:
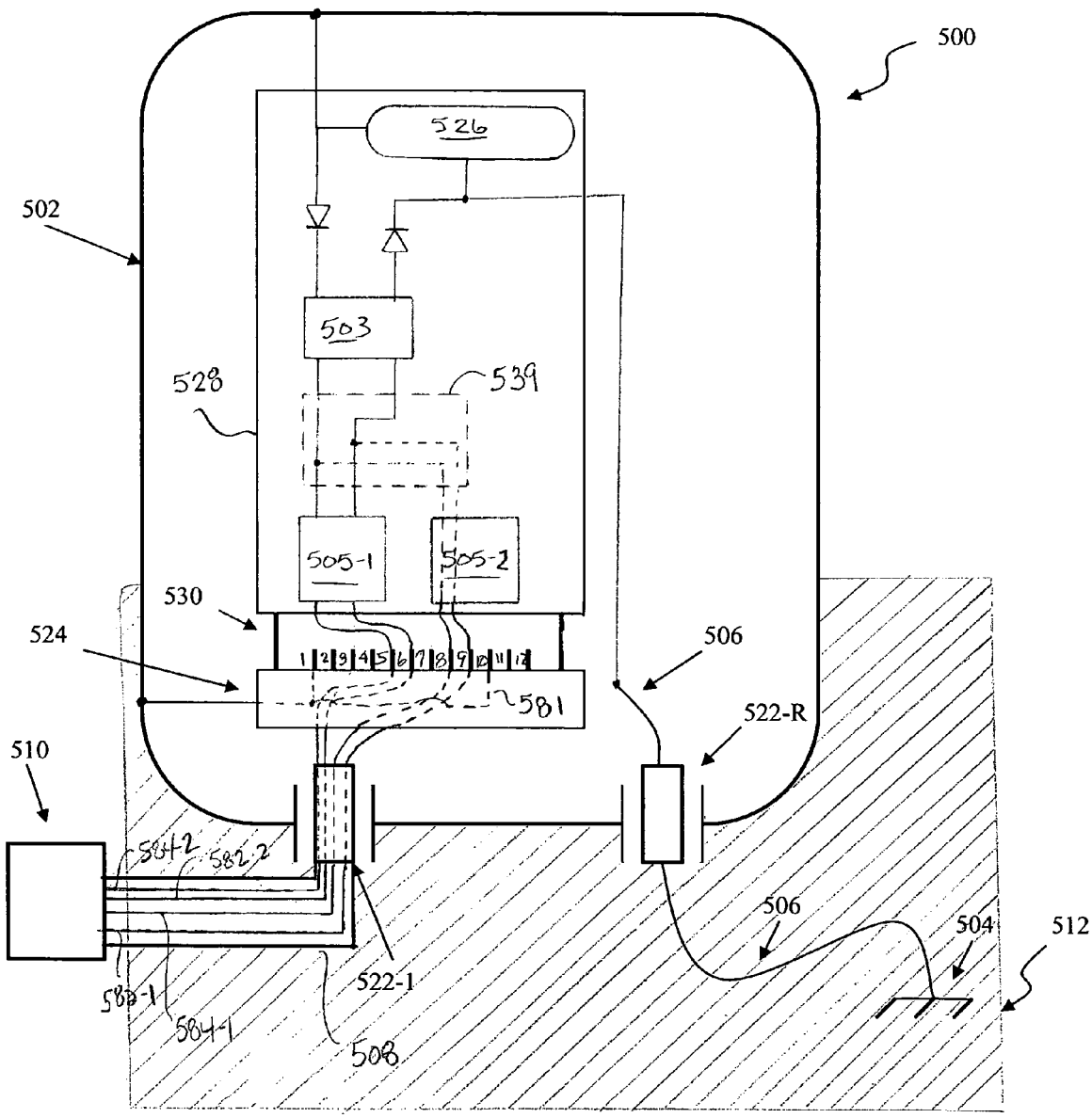
FIG. 5 is an illustration of an alternate embodiment of an impressed-current cathodic protection system, according to the teachings of the present invention.

FIG. 5 is an illustration of another embodiment of an impressed-current cathodic protection system, shown generally at 500, according to the teachings of the present invention. System 500 includes a metallic housing 502. In this embodiment, local ground 504 functions as the permanent anode. Metallic housing 502 includes isolated connections 522-1 through 522-R. In this embodiment, isolated connections 522-1 and 522-R allow components within metallic housing 502 to couple with components outside of metallic housing 502 without altering the voltage of the particular components or metallic housing 502. In this embodiment, cable 508 and line 506 travel into metallic housing 502 through isolated connections 522-1 through 522-R.

Metallic housing 502 is adapted to couple to a network node 510. In one embodiment, network node 510 is a central office, remote terminal, or the like. In this embodiment cable 508 couples network node 510 to backplane 524 via isolated connection 522-1. Metallic housing 502 provides protection for electronics and in one embodiment provides protection for a plurality of repeater cards. In this embodiment, metallic housing 502 provides protection for one or more electronics cards and includes a cathodic protection card 528. Cathodic protection card 528 is adapted to couple to backplane 524 via a printed circuit board 530. In one embodiment, backplane 524 is a connector slot adapted to receive a variety of types of electronics cards. In one embodiment, cathodic protection card 528 is designed in the same form fit as repeater cards housed in metallic housing 502 and is received by the same type of backplane/connector slot 524 as other electronics cards. Cathodic protection card 528 includes a DC/DC power converter 503 that receives power from network node 510 over backplane 524 through a protection circuit 505-1, galvanic isolation circuit 526 and optional protocol synthesizer 539. In one embodiment, cathodic protection card 528 includes a second protection circuit 505-2 that is coupled between another twisted pair 582, 584 and DC/DC power converter 503.

In operation, optional protocol synthesizer 539 mimics a remote repeater and permits the supply of power from network node 510 using any standard provisioning scheme. For example, in one embodiment, optional protocol synthesizer 539 is configured to appear to node 510 as an ADC SPX-HRPTSWD1 Single Wide 239 HDSL Slimline Repeater Unit or the like. In operation, optional protocol synthesizer 539 extracts power from span cable 508. In one embodiment, one or more appropriate twisted pair(s) 582 and 584 in span cable 508 is provisioned for a standard central office powered service, such as POTS, ISDN, T1, HDSL, HDSL2, and the like, where 584-2 is the negative potential conductor of the primary provisioned pair, sometimes called the ring conductor, and 582-2 is the return conductor of the primary provisioned pair, sometimes called the tip conductor or battery return. Additional power can be obtained by the optional provisioning of additional pairs, where, for example, 584-1 is the negative potential conductor of the secondary provisioned pair and 582-1 is the return conductor of the secondary provisioned pair. The advantage of this method is that it allows an operator to provision for cathodic protection card 528 on the central office side utilizing existing products and technology.

In one embodiment, optional protocol synthesizer 539 is configured to make cathodic protection card 528 appear to be a network repeater element for the provisioned protocol. In operation, optional protocol synthesizer 539 uses functionality that exists on network repeater units today to provide any one or more of the functions discussed with respect to optional synthesizer 239 of FIG. 2.

Cathodic protection card 528 is coupled to ground (permanent anode) 504 via line 506 that pigtails from cathodic protection card 528 to local ground 504. When local ground 504 comes in contact with electrolyte 512 and metallic housing 502 comes in contact with electrolyte 512 another connection is made. In one embodiment, the connection is a positive current such as positive current 414-2 as shown in FIG. 4. Galvanic isolation circuit 526 is also connected to local ground 504 via line 506. In one embodiment, isolation circuit 526 is a diode array, polarization cell, or other means of providing effective grounding over a DC potential difference. A backplane ground 581 is coupled to metallic housing 502.

In operation, span power delivered from network node 510 is used to provide a DC voltage source that allows current to travel from cathodic protection card 528 to local ground 504 through line 506. Local ground 504 is referenced at 0.00 volts and metallic housing 502 is referenced at approximately −0.85 VDC. The potential difference between the protected metallic housing 502 and the local ground 504 inhibits the corrosion reaction of metallic housing 502 by displacing the electrochemical reaction to local ground 504.

Figure 6:
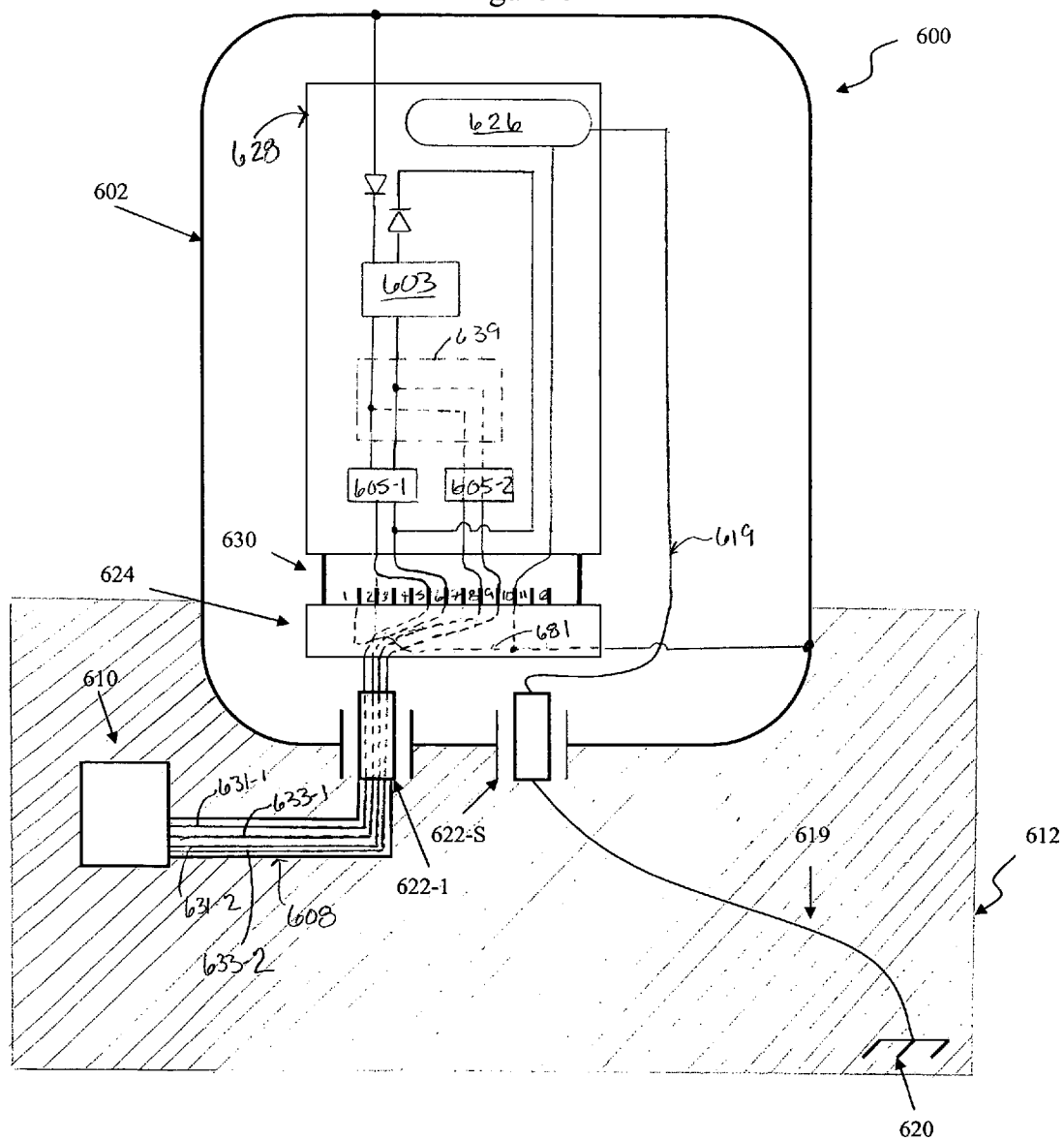
FIG. 6 is an illustration of an alternate embodiment of an impressed-current cathodic protection system, according to the teachings of the present invention.

FIG. 6 is an illustration of another embodiment of an impressed-current cathodic protection system generally shown at 600 according to the teachings of the present invention. System 600 includes a metallic housing 602 that provides protection for a variety of electronics equipment. In one embodiment, metallic housing 602 is a repeater apparatus housing for telecommunications systems and provides protection for one or more repeaters. Metallic housing 602 is adapted to connect by cable 608 to a network node 610. In one embodiment, network node 610 is a central office, remote terminal or the like.

In one embodiment, cable 608 includes ring conductor(s) 631 and tip conductor(s) 633. In this embodiment, tip conductor(s) 633 (loop tip) function as the effective permanent anode. Cable 608 further provides power to system 600. In one embodiment, −48 VDC is provided to metallic housing 602 equipment from network node 610 over cable 608 through ring conductor(s) 631.

Metallic housing 602 provides protection for one or more electronics cards. In this embodiment, one of the electronics cards is a cathodic protection card 628. In this embodiment, metallic housing 602 includes isolated connections 622-1 through 622-S that allow components within metallic housing 602 to couple with components outside of metallic housing 602 without altering the voltage of the particular components or metallic housing 602. In this embodiment, cable 608 and ground line 619 travel into metallic housing 602 through isolated connections 622-1 and 622-S, respectively.

Cathodic protection card 628 is adapted to couple to a backplane 624 via a printed circuit board 630. Cable 608 provides power to backplane 624 via isolated connection 622-1. In one embodiment, backplane 624 is a connector slot adapted to receive a variety of electronics cards. In one embodiment, cathodic protection card 628 is designed in the same form fit as repeater cards housed in metallic housing 602 and is received by the same backplane/connector slot 624 as other electronics cards. Cathodic protection card 628 includes a DC/DC power converter 603 that receives power from network node 610, through a protection circuit 605-1 and optional protocol synthesizer 639 over backplane 624. In one embodiment, cathodic protection card 628 includes a second protection circuit 605-2 that is coupled between another twisted pair and DC/DC power converter 603.

In operation, optional protocol synthesizer 639 mimics a remote repeater and permits the supply of power from network node 610 using any standard provisioning scheme. For example, in one embodiment, optional protocol synthesizer 639 is configured to appear to node 610 as an ADC SPX-HRPTSWD1 Single Wide 239 HDSL Slimline Repeater Unit or the like. In operation, optional protocol synthesizer 639 extracts power from span cable 608. In one embodiment, one or more appropriate twisted pair(s) 631-1, 633-1 and 631-2, 633-2 in span cable 608 are provisioned for a standard central office powered service, such as POTS, ISDN, T1, HDSL, HDSL2, and the like, where 631-1 is the negative potential conductor of the primary provisioned pair, sometimes called the ring conductor, and 633-1 is the return conductor of the primary provisioned pair, sometimes called the tip conductor or battery return. Additional power can be obtained by the optional provisioning of additional pairs, where, for example, 631-2 is the negative potential conductor of the secondary provisioned pair and 633-2 is the return conductor of the secondary provisioned pair. The advantage of this method is that it allows an operator to provision for cathodic protection card 628 on the central office side utilizing existing products and technology.

In one embodiment, optional protocol synthesizer 639 is configured to make cathodic protection card 628 appear to be a network repeater element for the provisioned protocol. In operation, optional protocol synthesizer 639 uses functionality that exists on network repeater units today to provide any one or more of the functions discussed with respect to optional synthesizer 239 of FIG. 2.

Cable 608 coupled between network node 610 and metallic housing 602 includes one or more twisted pairs and each twisted pair includes ring conductor(s) 631 and tip conductor(s) 633. In this embodiment, positive current flows from metallic housing 602 to the network node 610 ground on tip conductor(s) 633 contained within 608. Positive current flows from the network node 610 ground through electrolyte 612 back to metallic housing 602. This embodiment describes the largest separation of a permanent anode and a protected housing. The effectiveness of this embodiment requires relatively low resistivity in the soil between network node 610 and metallic housing 602. The embodiment has some basis in that certain remote anode beds for pipelines with impressed current cathodic protection are located "several kilometers" away. The advantage associated with this embodiment is no need to locate a permanent anode at the site of the metallic housing 602. Connection of local ground 620 to metallic housing 602 makes use of a diode array or galvanic isolator 626 that provides DC decoupling while still providing an effective grounding path. In one embodiment, isolation circuit 626 is a diode array, polarization cell, or other means of providing effective grounding over a DC potential difference. A backplane ground 681 is coupled to metallic housing 602.

A number of embodiments of the invention defined by the following claims have been described. Nevertheless, it will be understood that various modifications to the described embodiments may be made without departing from the scope of the claimed invention. Accordingly, other embodiments are within the scope of the following claims.

What is claimed is:

1. A cathodic protection system comprising:
   a metallic housing;
   a backplane situated within the metallic housing;
   a cathodic protection card coupled to the backplane;
   a permanent anode, external to the metallic housing, coupled to the cathodic protection card through an isolated port; and
   wherein the cathodic protection system is powered using span power;
   wherein the permanent anode and metallic housing are adapted to form a closed circuit when both come in contact with an electrolyte; and
   wherein the permanent anode is maintained at a higher potential than the metallic housing.

2. The cathodic protection system of claim 1, further comprising a local ground coupled to the cathodic protection card through a second isolated port.

3. The cathodic protection system of claim 2, wherein the cathodic protection card comprises:
   protection circuitry;
   a DC-to-DC power converter; and
   a galvanic isolation circuit, connected to the local ground.

4. The cathodic protection system of claim 3, wherein the protection circuitry protects from at least one of over-current, over-voltage, and polarity reversal.

5. The cathodic protection system of claim 1, further comprising:
   a local ground coupled to the cathodic protection card and to the metallic housing;
   wherein the permanent anode is adapted to maintain a higher potential than the metallic housing and the local ground.

6. The cathodic protection system of claim 5, wherein the cathodic protection card comprises:
   protection circuitry; and
   a DC-to-DC power converter.

7. The cathodic protection system of claim 6, wherein the protection circuitry protects from at least one of over-current, over-voltage, and polarity reversal.

8. The cathodic protection system of claim 1, wherein the permanent anode is a local ground.

9. The cathodic protection system of claim 8, wherein the cathodic protection card comprises:
   protection circuitry;
   a DC-to-DC power converter; and
   a galvanic isolation circuit, connected to the local ground.

10. The cathodic protection system of claim 9, wherein the protection circuitry protects from at least one of over-current, over-voltage, and polarity reversal.

11. The cathodic protection system of claim 1, further comprising a network node, external to the metallic housing, coupled to the backplane by one or more cables through a third isolated port.

12. The cathodic protection system of claim 11, wherein the span power is provided by the network node through the one or more cables.

13. The cathodic protection system of claim 11, wherein the network node is one of a central office and a remote terminal.

14. The cathodic protection system of claim 1, wherein the metallic housing houses electronic equipment.

15. The cathodic protection system of claim 1, wherein the backplane is a connector slot and backplane for common telecommunication circuit repeater cards.

16. The cathodic protection system of claim 1, wherein one or more of repeaters and electronic circuit cards are also situated within the metallic housing.

17. The cathodic protection system of claim 16, wherein the one or more of repeaters and electronic circuit cards are coupled to the backplane.

18. The cathodic protection system of claim 1, wherein the potential difference between the permanent anode and the metallic housing is maintained at up to approximately 1.2V.

19. The cathodic protection system of claim 1, wherein the permanent anode is maintained at approximately 0V, and the metallic housing is maintained at approximately −0.85V relative to the permanent anode.

20. A cathodic protection system comprising:
   a metallic housing;
   a backplane for telecommunication repeater cards, situated within the metallic housing;
   a cathodic protection card coupled to the backplane;
   a permanent anode, external to the metallic housing, coupled to the cathodic protection card through an isolated port; and
   a network node, external to the metallic housing, coupled to the cathodic protection card by one or more cables through an isolated port;
   wherein the cathodic protection card is adapted to receive power from the network node through the one or more cables;

wherein the permanent anode and metallic housing are adapted to form a closed circuit when both come in contact with an electrolyte; and wherein the permanent anode is maintained at a higher potential than the metallic housing.

21. The cathodic protection system of claim 20, wherein the cathodic protection card comprises at least one of:
protection circuitry;
a DC-to-DC power converter;
a galvanic isolation circuit; and
a protocol synthesizer that mimics a remote repeater and receives power from the network node for maintaining the permanent anode at a higher potential than the metallic housing.

22. The cathodic protection system of claim 21, wherein the protocol synthesizer is adapted to provide one or more of:
support embedded operations channels (EOC) for maintenance and provisioning purposes;
support definition of a unique address for the cathodic protection card such that the messages on an end-to-end EOC can be distinguished between any repeaters and the cathodic protection card;
implement timing independent of a first side and a second side of the cathodic protection card to ensure that impairments on one side of the cathodic protection card are not propagated to the other side;
pass loop power through to a repeater or cathodic protection card housed in a separate metallic housing;
provide a DC continuity indication for shorts;
operate normally even when no span current is drawn by the cathodic protection card;
shut off power when a non-compatible component is recognized;
support the capability to disable loop power enabling when a fault is detected by the cathodic protection card and re-enabling loop power enabling when the fault is cleared; and
support a tone-through feature to allow tracing through the cathodic protection card when the cathodic protection card is not powered.

23. A cathodic protection system comprising:
a metallic housing;
a backplane situated within the metallic housing;
a cathodic protection card coupled to the backplane;
a network node, external to the metallic housing, coupled to the cathodic protection card by one or more cables through an isolated port; and
a local ground coupled to the cathodic protection card through a second isolated port;
wherein the cathodic protection card is adapted to receive power from the network node through the one or more cables;
wherein one of the one or more cables is grounded at the network node;
wherein the grounded cable through a tip conductor acts as a permanent anode;
wherein the permanent anode and metallic housing are adapted to form a closed circuit when both come in contact with an electrolyte; and
wherein the grounded cable is adapted to maintain a higher potential than the metallic housing.

24. The cathodic protection system of claim 23, wherein the cathodic protection card comprises:
protection circuitry;
a DC-to-DC power converter; and
a galvanic isolation circuit, connected to the local ground.

25. The cathodic protection system of claim 24, wherein the protection circuitry protects from at least one of over-current, over-voltage, and polarity reversal.

26. The cathodic protection system of claim 23, wherein the network node is one of a central office and a remote terminal.

27. The cathodic protection system of claim 23, wherein the metallic housing houses electronic equipment.

28. The cathodic protection system of claim 23, wherein the backplane is a connector slot and backplane for common telecommunication circuit repeater cards.

29. The cathodic protection system of claim 23, wherein one or more of repeaters and electronic circuit cards are also situated within the metallic housing and coupled to the backplane.

30. The cathodic protection system of claim 23, wherein the potential difference between the permanent anode and the metallic housing is maintained at up to 1.2V.

31. The cathodic protection system of claim 23, wherein the permanent anode is maintained at approximately 0V, and the metallic housing is maintained at approximately −0.85V relative to the permanent anode.

32. A method of cathodic protection for a metallic housing, the method comprising:
coupling a cathodic protection card to a backplane within the metallic housing;
connecting a permanent anode, external to the metallic housing, to the cathodic protection card by a line through an isolated port;
providing span power to the cathodic protection card;
maintaining the permanent anode at a higher potential than the metallic housing; and
when the permanent anode and metallic housing both come in contact with an electrolyte, forming a closed circuit between the permanent anode and the metallic housing such that positive current flows from the metallic housing to the permanent anode through the line, and positive current flows from the permanent anode to the metallic housing through the electrolyte.

33. The method of claim 32, further comprising grounding the cathodic protection card to a local ground through a second isolated port.

34. The method of claim 33, further comprising:
protecting the cathodic protection card from at least one of over-current, over-voltage, and polarity reversal.

35. The method of claim 34, further comprising:
DC-to-DC power conversion of the span power; and
bleeding through any power above −0.85 volts.

36. The method of claim 34, further comprising:
when a surge is detected, passing the surge to the local ground.

37. The method of claim 32, further comprising grounding the cathodic protection card and the metallic housing to a local ground and maintaining a higher potential at the permanent anode than the metallic housing and the local ground.

38. The method of claim 32, wherein maintaining the permanent anode at a higher potential than the metallic housing comprises maintaining the permanent anode at up to 1.2V above the metallic housing.

39. The method of claim 37, further comprising:
maintaining the permanent anode at approximately 0V, and the metallic housing at approximately −0.85V relative to the permanent anode.

40. A method of cathodic protection for a metallic housing, the method comprising:

coupling a cathodic protection card to a backplane within the metallic housing;

providing span power to the cathodic protection card;

grounding the metallic housing and the cathodic protection card to a local external ground via a line that passes through an isolated port of the metallic housing, wherein the local ground acts as a permanent anode;

maintaining the permanent anode at a higher potential than the metallic housing; and when the permanent anode and metallic housing both come in contact with an electrolyte, forming a closed circuit between the permanent anode and the metallic housing such that positive current flows from the metallic housing to the permanent anode through the line, and positive current flows from the permanent anode to the metallic housing through the electrolyte.

41. The method of claim 40, further comprising:

protecting the cathodic protection card from at least one of over-current, over-voltage, and polarity reversal.

42. The method of claim 41, further comprising:

DC-to-DC power conversion of the span power; and bleeding through any power above −0.85 volts.

43. The method of claim 41, further comprising:

when a surge is detected, passing the surge to the local ground.

44. The method of claim 40, wherein maintaining the permanent anode at a higher potential than the metallic housing comprises maintaining the permanent anode at up to 1.2V above the metallic housing.

45. The method of claim 40, further comprising:

maintaining the permanent anode at approximately 0V, and the metallic housing at approximately −0.85V relative to the permanent anode.

46. The method of claim 40, wherein the cathodic protection card further includes circuitry that mimics a remote repeater.

47. The method of claim 46, wherein the circuitry provides one or more of:

supporting embedded operations channels (EOC) for maintenance and provisioning purposes;

supporting definition of a unique address for the cathodic protection card such that the messages on an end-to-end EOC can be distinguished between any repeater and the cathodic protection card;

implementing timing independent of a first side and a second side of the cathodic protection card to ensure that impairments on one side of the cathodic protection card are not propagated to the other side;

passing loop power through to a repeater or cathodic protection card housed in a separate metallic housing;

providing a DC continuity indication for shorts;

operating normally even when no span current is drawn by the cathodic protection card;

shutting off power when a non-compatible component is recognized;

supporting the capability to disable loop power enabling when a fault is detected by the cathodic protection card and re-enabling loop power enabling when the fault is cleared; and supporting a tone-through feature to allow tracing through the cathodic protection card when the cathodic protection card is not powered.

* * * * *